J. S. PIXLEY.
BAIL HOLDER FOR LANTERNS.
APPLICATION FILED MAY 2, 1913.
1,070,626.
Patented Aug. 19, 1913.
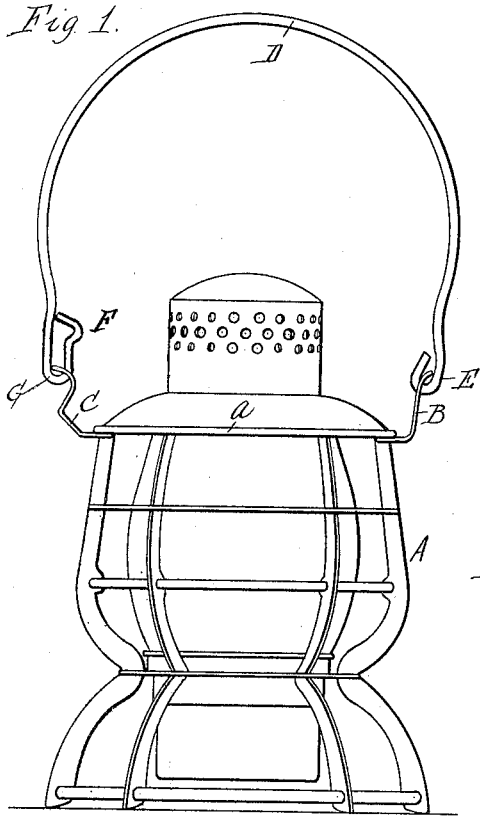
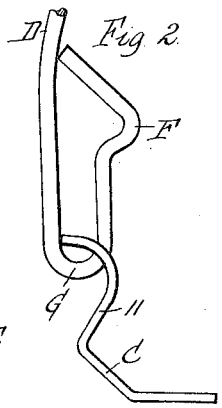
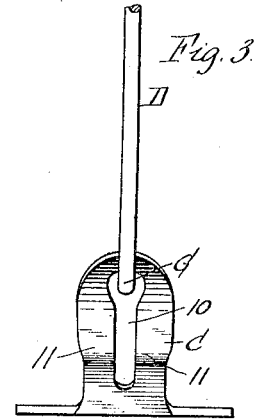
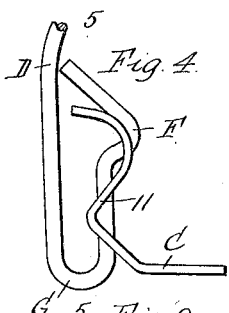
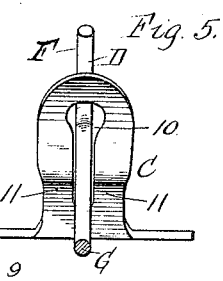
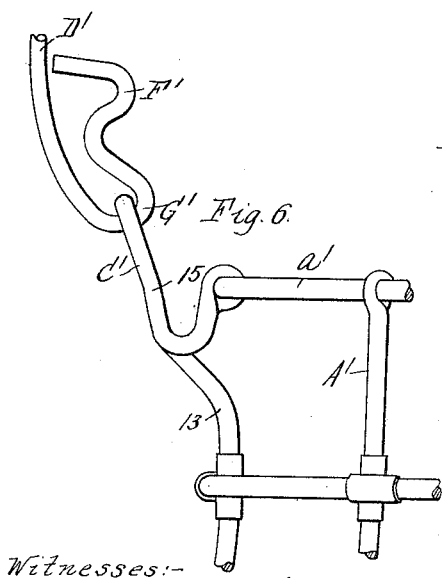
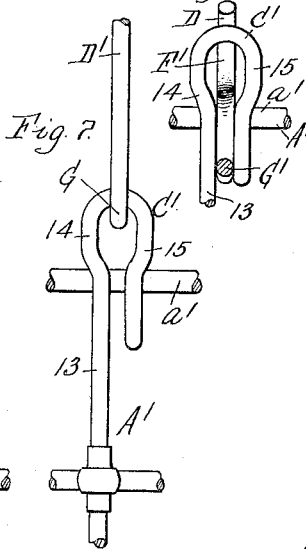
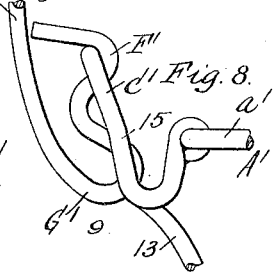
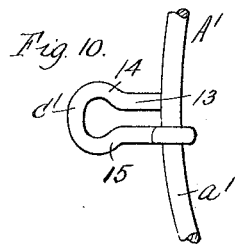
Witnesses:—
C. H. Mossack.
A. G. Dimond.
Inventor
Judson S. Pixley
By Wilhelm, Parker & Hurd
Attorneys.

UNITED STATES PATENT OFFICE.

JUDSON S. PIXLEY, OF NEW YORK, N. Y., ASSIGNOR TO ARMSPEAR MANUFACTURING COMPANY, OF NEW YORK, N. Y.

BAIL-HOLDER FOR LANTERNS.

1,070,626.

Specification of Letters Patent. Patented Aug. 19, 1913.

Application filed May 2, 1913. Serial No. 764,992.

*To all whom it may concern:*

Be it known that I, JUDSON S. PIXLEY, a citizen of the United States, residing at New York, in the county of New York and State of New York, have invented a new and useful Improvement in Bail-Holders for Lanterns, of which the following is a specification.

This invention relates to that class of bail holders by means of which the bail can be left free to swing or pivot on the lantern frame or can be rigidly connected with the lantern frame, as may be desired.

The object of the invention is to produce a simple, inexpensive and convenient bail holder of this general character.

In the accompanying drawings: Figure 1 is a front elevation of a lantern frame in which the frame and the bail ears are made of sheet steel and to which this improvement is applied, the bail being shown in its upper position in which it is pivotally connected with the frame. Fig. 2 is a fragmentary front elevation, on an enlarged scale, of the movable end of the bail and the ear in which it engages. Fig. 3 is a side elevation thereof. Fig. 4 is a fragmentary front elevation similar to Fig. 2 and showing the bail in its lower position in which it is rigidly connected with the lantern frame. Fig. 5 is a sectional side elevation thereof, on line 5—5, Fig. 4. Fig. 6 is a fragmentary front elevation of a wire lantern frame provided with this improvement and showing the bail in its upper position. Fig. 7 is a fragmentary side elevation thereof. Fig. 8 is a fragmentary front elevation, showing the bail in its lower position. Fig. 9 is a sectional side elevation on line 9—9, Fig. 8. Fig. 10 is a top plan view of the ear.

Like reference characters refer to like parts in the several figures.

Referring to Figs. 1-5, A represents the lantern frame and $a$ the top ring thereof provided with bail ears B and C which are secured to the ring in any suitable manner. D represents the bail provided with a non-adjustable end having a hook E which is engaged in the ear B of the frame, and with an adjustable end having a loop which is provided with an upper bight or hook F and below said hook with a lower bight G, either of which can be engaged with the ear C. The non-adjustable hook E of the bail engaged in the ear B permits the bail to swing with reference to the lantern frame in the usual manner.

The adjustable opposite end of the bail can be engaged with the adjacent ear C in two different positions. In the upper portion of this end of the bail the latter is engaged with the ear by means of the lower bight G, as represented in Figs. 1, 2 and 3, and is free to swing with reference to the frame in the usual manner, while in the lower position the bail is held rigidly with reference to the frame. For that purpose the opening 10 of the ear C is elongated downwardly and formed between side pieces 11 of the ear so that the end portion of the bail can be adjusted upwardly or downwardly between these side portions of the ear. The side pieces or restraining members are bent to approximately angular or elbow form, so that the lower bight G of the loop stands between these side pieces when the adjustable end of the bail is in its lower position, as represented in Figs. 4 and 5, in which the adjustable end of the bail is engaged with the ear C by means of the upper bight or hook F. In this position of the bail the side pieces of the ear standing on opposite sides of the part of the bail which lies below the hook F prevent the bail from swinging on the hooks F and E and hold the bail rigidly with reference to the frame.

The adjustable end of the bail is readily shifted from one position to the other by springing the bail out of engagement with the ear C and shifting the end of the bail up or down on the ear, as may be necessary.

In the construction represented in Figs. 6–10, the lantern frame and its ears are represented as being constructed of wire.

A' represents the frame and $a'$ the top ring thereof. C' represents the bail ear which is formed by bending the upright wire 13 of which this ear forms part.

D' represents the bail, F' the upper bight or hook of the loop and G' the lower bight formed on the adjustable end of the bail and engaging the ear C'. The ear is formed with side pieces 14 and 15 between which the end portion of the bail is adjustable up and down and which stand on opposite sides of the loop G' and hold the bail rigidly with reference to the frame when the adjustable end of the bail is in its lower position and the hook F' is engaged with the ear, as represented in Figs. 8 and 9. When the bail is in the upper position, with the lower bight G' engaged with the ear, as represented in Figs. 6 and 7, the bail is free to swing on the frame.

The ear C' can be conveniently produced by forming its side piece 14 integrally with the upright frame wire 13, and extending its side piece 15 to connect with the top ring a' of the frame.

I claim as my invention:

1. The combination with a lantern frame, of a bail ear having upright restraining members which are spaced apart, and a bail having a loop which is vertically adjustable between said members and which is provided with two bights, one above the other, either of which can be engaged with said ear, the bail being free to swing on the ear when the lower bight of the loop is engaged therewith and held rigidly by said restraining members of the ear when the upper bight is engaged with the ear.

2. The combination with a lantern frame, of a bail ear having an upright slot formed between side pieces of the ear, and a bail having a loop which is vertically adjustable in said slot and which is provided with two bights, one above the other, either of which can be engaged with said ear, the bail being free to swing on the ear when the lower bight of the loop is engaged therewith and held rigidly by the side pieces of the ear when the upper bight is engaged with the ear.

Witness my hand in the presence of two subscribing witnesses.

JUDSON S. PIXLEY.

Witnesses:
F. D. SPEAR,
J. STANTON.

---

Copies of this patent may be obtained for five cents each, by addressing the "Commissioner of Patents, Washington, D. C."